June 13, 1933.  R. L. REAGIN  1,913,955
APPARATUS FOR TREATING LIQUID WITH CHEMICALS
Filed Feb. 11, 1929
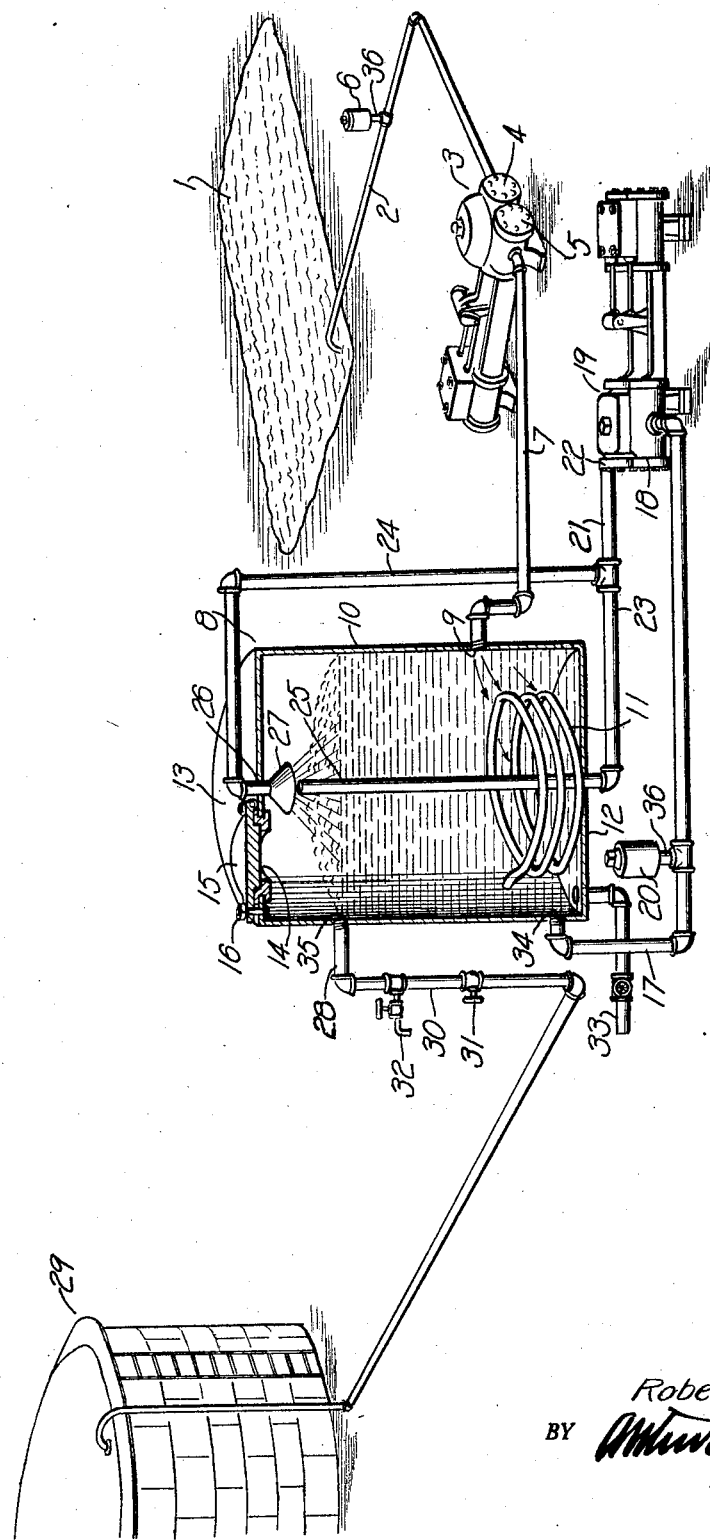
INVENTOR.
Robert L. Reagin
BY
ATTORNEY Patented June 13, 1933

1,913,955

UNITED STATES PATENT OFFICE

ROBERT L. REAGIN, OF KELLYVILLE, OKLAHOMA, ASSIGNOR OF ONE-THIRD TO C. T. MEFFORD, OF KELLYVILLE, OKLAHOMA

APPARATUS FOR TREATING LIQUID WITH CHEMICALS

Application filed February 11, 1929. Serial No. 339,040.

My invention relates to methods of and apparatus for treating crude oil and basic sediment oil and more particularly to the blending of chemicals with the oil for separating the heavy ends and impurities from the lighter components of the oil, the principal object of the present invention being to recirculate and reheat the oil, and introduce the chemicals at selected stages, for effecting thorough mixing of the chemicals with the oil and separation of the light components from the heavy ends. Further objects of the invention are to confer part of the heat treatment before all of the chemical agents have been applied and to effect thorough blending of the fully treated mixture.

In accomplishing these and other objects of the invention, I have provided a novel method and apparatus including improved details of structure, the preferred forms of which are illustrated in the accompanying drawing, wherein an example of apparatus for using the method is shown assembled for operation, parts thereof being in central vertical section for better illustration.

Referring in detail to the drawing:

1 designates a supply reservoir or pit containing a fluid to be treated, for example crude oil or basic sediment oil removed from wells and held in reserve preparatory to delivery to a chemical treating system and from the system to storage tanks.

Leading from the pit 1 is a pipe line 2 connected with a pump 3 including a suction cylinder 4 and a pressure cylinder 5, and a chemical receiving bowl 6 is fitted on the line 2 in communication therewith for introducing chemicals into the oil drawn through the line by the pump to form a mixture, and provide for dissolving of the chemical in the oil.

Connected with the outlet or pressure cylinder 5 of the pump is a pipe line 7 leading to a chemical mixing tank 8 and terminating in an inlet 9 in the side wall 10 of the tank, and slightly above the level of a heater coil 11 located in the lower portion of the tank and preferably supported by the bottom 12 thereof.

The tank 8 is preferably of cylindrical shape and provided with a closed top 13 having a manhole 14 fitted with a hinged cover 15 secured in closed position by a clamping bolt 16.

Communicating with the tank 8 at a point opposite the inlet 9 and slightly above the bottom 12 is an outlet conduit 17 leading to the intake cylinder 18 of a pump 19, the conduit being provided with a chemical receiving bowl 20 whereby chemicals may be introduced into the stream of oil drawn from the bottom portion of the tank by the pump 19.

A manifold conduit 21 is connected with the discharge cylinder 22 of the pump 19 and provided with discharge pipes or branches 23 and 24 having outlet ends located in the tank as presently described.

The discharge pipe 23 includes a portion 25 extending vertically and centrally upward through the tank and terminating in the upper portion thereof at a point adjacent the top 13. The major portion of the pipe 24 extends exteriorly of the tank, and a branch 26 thereof extends centrally downward through the top 13 and is provided with an outwardly flared mouth 27 in close spaced relation with the end 25 of the pipe 23, and preferably concentric therewith.

Connected with the tank 8 at a point slightly below the level of the outlet openings of the discharge pipes 23 and 24 is an off-take pipe 28 leading to a storage tank 29 located preferably at a lower level than the mixing tank 8 to permit gravitational flow of the oil thereto.

The discharge pipes 23 and 24 therefore return liquid to the tank, and discharge recirculated liquid in opposing streams into an area above the off-take, and above the operating level of liquid in the tank.

The off-take pipe 28 includes a vertical section 30, and a control valve 31 and bleeder valve 32 are interposed in said section for controlling outflow and for taking test samples of oil from the tank 8.

A drain pipe 33 is provided at the bottom of the tank 8, whereby the impurities deposited by the oil may be removed from the tank.

Attention is called to the location of the recirculating outlet 34 of the tank to which the recirculating conduit 17 is connected, adjacent and in spaced relation with the bottom of the tank and in the area or zone occupied by the heating coil, and the position of the offtake or final discharge outlet 35 adjacent the top of the tank and in substantially spaced relation with the recirculating outlet 34 and the coil, whereby a substantial area or zone is preferably provided between the heating coil and the offtake outlet for blending recirculated liquid. The return conduit branch 25 extends through the area of the heating coil, on the axis thereof, the coil preferably conforming to the cross-section of the tank which is preferably circular.

The bowls 6 and 20 are preferably mounted on the upper peripheries of the lines 2 and 17, and connected therewith by vertical nipples 36.

In practicing the method with the apparatus described, the chemical containing bowls 6 and 20 are filled with the desired chemicals and the pump 3 is set in operation for delivering oil from the pit through the pipe lines 2 and 7 into the mixing tank 8.

The oil flowing through the pipe line 2 takes up chemical substance from the bowl 6 and conveys the same into the mixing tank.

When a sufficient quantity of oil has been delivered into the tank 8 to cover the outlet 34 to the conduit 17, the pump 19 is set in operation and liquid including oil and chemicals is drawn from the tank through the conduit 17 and charged with a second charge of chemical treating substance by means of the chemical container bowl 20. The chemically recharged oil passes from the discharge cylinder 22 of the pump 19 into the manifold conduit 21, and from the conduit into the discharge pipes 23 and 24 under equal pressure and at equal rates of flow.

The oil is forcibly ejected from the opposed open ends of the discharge pipe branches in opposite directions, the conical mouth of the branch 26 receiving the discharge from the upwardly directed branch 25, and the oil being delivered in a spreading conical column to the body of oil, thus causing turbulent movement of the oil in the tank.

The repeated circulation or recycling of the oil from the bottom portion of the tank, and into the tank through the discharge pipes 23 and 24 causes thorough heating of the oil by the heater coil 11 and thorough blending of the oil with the chemical substances.

The pump 3 is controlled to limit the inflow of oil to the tank to an amount sufficient to cover the outlet 35, and the control valve 31 remains closed, during the preliminary mixing process.

Due to the thorough mixing of the chemicals with the oil, the reactions of the chemicals with the components of the oil, the reheating and the period of travel of the chemicals containing bodies of oil, the heavy ends or impurities are separated from the lighter components of the oil and precipitated and deposited on the bottom of the tank, in the area below the outlet 34 from which they may be removed through the drain 33.

Samples of oil are taken through the bleeder valve 32 during the mixing process until the suitable amounts of chemicals taken up by the columns of oil and period of recirculating the oil in the tank, are determined for producing the required mixture for the particular grade of oil being treated.

When the above factors for producing the desired result are determined, the valve 31 is opened to permit outflow of the treated oil to the storage tank, and the speeds of the pumps 3 and 19 are regulated relatively for securing the desired recirculation of the oil for heating and mixing with the chemicals previous to outflow from the mixing tank.

What I claim and desire to secure by Letters Patent is:

1. Apparatus for treating liquid with chemicals in the presence of heat, including a tank having an inlet spaced from its bottom and an outlet spaced from its top, a heater in the bottom portion of the tank, means for delivering liquid to the tank adjacent said heater, means including a pipe communicating with the lower portion of the tank for removing heated liquid therefrom, means for introducing chemicals into said pipe, and means for delivering the heated liquid in divided streams back into the tank independently of said first-named delivering means.

2. Apparatus for treating liquid with chemicals in the presence of heat, including a source of liquid supply and a tank having an inlet spaced from its bottom and an outlet spaced from its top, a heater in the bottom portion of the tank, means for delivering liquid from said source to the tank, means including a pipe communicating with the lower portion of the tank for removing heated liquid therefrom, means for introducing chemicals into said pipe, and means for redelivering the removed heated liquid in diverging streams on the surface of body of liquid to agitate said liquid body.

In testimony whereof I affix my signature.

ROBERT L. REAGIN.